March 2, 1926.

R. HAMADA

TRIMMING KNIFE

Filed March 9, 1925

1,575,425

Inventor.
Ryozo Hamada.
By Dewey, Strong, Townsend & Loftus
Attorneys.

Patented Mar. 2, 1926.

1,575,425

UNITED STATES PATENT OFFICE.

RYOZO HAMADA, OF SAN FRANCISCO, CALIFORNIA.

TRIMMING KNIFE.

Application filed March 9, 1925. Serial No. 14,006.

*To all whom it may concern:*

Be it known that I, RYOZO HAMADA, a citizen of Japan, residing at the city and county of San Francisco and State of California, have invented new and useful Improvements in Trimming Knives, of which the following is a specification.

This invention relates to fruit and vegetable peeling devices and particularly to an improved potato peeler. My improved peeler comprises a body member, preferably of wood, having one end formed into a handle and the other end thereof provided with peeling and trimming knives. The construction and arrangement of these knives on the body are such as to provide an article which can be easily and cheaply manufactured and which will be most efficient and convenient in use. It is the primary object of my invention to provide an improved potato peeler of this character.

I am aware that other and various similar peeling devices have been heretofore suggested. Such devices, however, are mostly inefficient and inconvenient for various reasons and the cost of manufacturing thereof is quite considerable. My improved peeler is of simple construction, comprising primarily a body member having a peeling knife and a trimming knife very simply secured thereto and in such close relation that the two can be interchangeably used without the inconvenience usually attending such devices. It is a further object of my invention to provide such an improved device.

In the accompanying drawing I have illustrated one specific embodiment of my invention, but it will be understood that the invention can be otherwise embodied and that the drawing is not to be construed as defining or limiting the invention, the claims appended to the specification being relied upon for that purpose.

Referring to the figures of the drawing.

Figure 1:
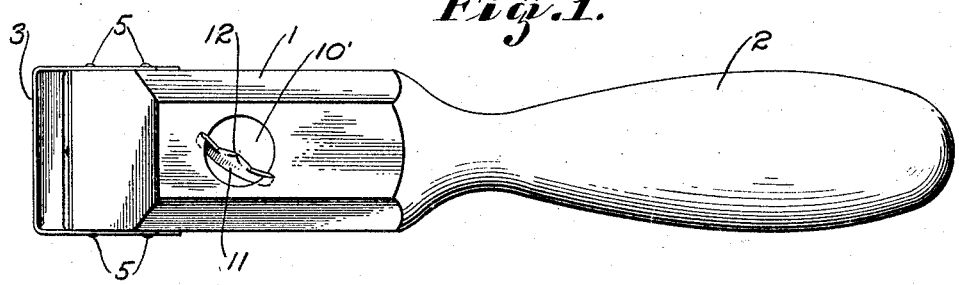
Fig. 1 is a plan view of my improved potato peeler.

In the drawing 1 indicates the knife-carrying portion and 2 the handle portion of my device, the same preferably being constructed of a block of wood. The peeling knife comprises a U-shaped metal strip sharpened at 4. This strip is preferably of brass since such metal will not corrode or rust. The two ends of this strip are secured to the side of the body 1 by nails 5. The end of the body adjacent the knife 4 is protected by a plate 6 secured to the body by nails 7. The strip 3 preferably flares outwardly at 8 and the end of the body 1 is beveled in the opposite direction at 9 to provide ample space for the parings cut by the edge 4 as will be readily understood.

An opening 10 is provided through the body 1 and a trimming knife 11 having a V-shaped trimming blade 12 is mounted in one end of this opening. The entire outer edge and the two ends of this knife or blade are preferably sharpened whereby the outer edge serves as a trimming blade and the knife can be mounted in the body merely by forcing the sharpened ends thereof into the wood. It will furthermore be noted that the knife 11 is somewhat curved and is mounted to one side of the opening 10, the concave and cutting edge of the blade facing the larger portion 10' of the opening as divided by the knife.

Figure 3:
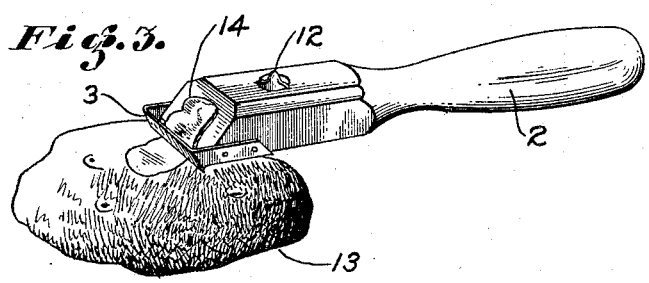
Fig. 3 is a perspective view showing the use of my device as a peeler.
Figure 4:
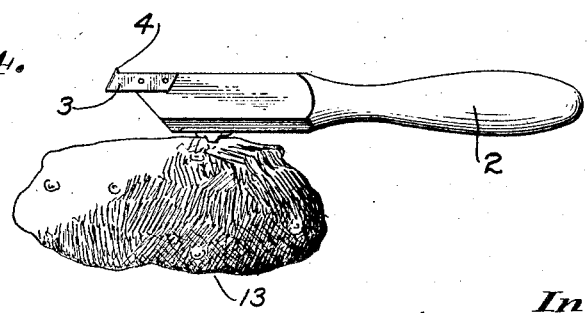
Fig. 4 is a perspective view showing how the trimming knife is used.

It is believed that the construction and operation of my device and the various advantages thereof will be obvious from the above description taken in connection with the accompanying drawing. The operation thereof is substantially as follows:

In Fig. 3 the device is illustrated as peeling a potato 13. The thickness of the peeling 14 is regulated by the distance between the plate 6 and the edge 4 of the knife. In manufacturing the device this distance is so regulated as to peel the potato with the greatest possible economy. The operation of the peeler is exceedingly simple. The operator need only hold the blade 4 in contact with the potato and draw the same over the surface thereof. It will be noted that the device need not be held at any particular angle since the shape of the knife 4 is such that the same will cut its way to the proper depth and properly remove the peeling without any particular care on the part of the operator.

Figure 2:
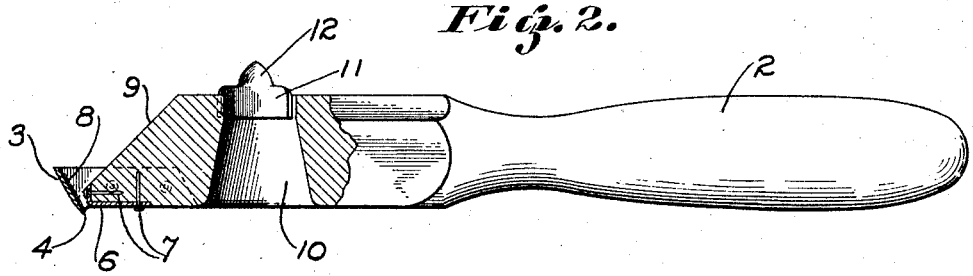
Fig. 2 is a side view thereof partially in longitudinal section.

The function of the knife 11 is to trim the spots and eyes from the potato. The cutting edge of the blade faces the large portion 10' of the opening 10, whereby the trimmings drop through such opening. The opening flares outwardly through the body 1 away from the blade 11 as indicated in Fig. 2. This construction facilitates the quick disposal of the trimmings as they are severed by the knife. The knife 11 is mounted very simply, but securely within the opening 10 and its close relation to the peeling knife 3 provides for the use of both knives with the greatest convenience.

Having thus described my invention, what I claim and desire to secure by Letters Patent is:

1. A vegetable peeler comprising a handle having a body portion on one end thereof, the body portion having a hole therethrough, and a trimming knife thereon and co-operating with the hole whereby the cuttings thereof fall through the hole.

2. A vegetable peeler comprising a wooden handle having an integral body portion on one end thereof, the body portion having a hole therethrough, and a trimming knife mounted on the body portion within the hole and projecting outside the hole beyond one face of the body portion, the arrangement being such that the cuttings of the trimming knife will fall through the hole.

3. A vegetable peeler comprising a handle having a wood body portion, and a trimming knife having a projecting cutting edge and sharpened edge portions, the trimming knife being secured in place by forcing the said sharpened edge portions into the wood.

RYOZO HAMADA.